455-296 SR
FIP8106 XR 3,750,022

United States Patent [19] [11] 3,750,022
Curry et al. [45] July 31, 1973

[54] SYSTEM FOR MINIMIZING UPSTREAM NOISE IN A SUBSCRIBER RESPONSE CABLE TELEVISION SYSTEM

[75] Inventors: Samuel J. Curry, Los Angeles; Sam Reisenfeld, Reseda, both of Calif.

[73] Assignee: Hughes Aircraft Company, Culver City, Calif.

[22] Filed: Apr. 26, 1972

[21] Appl. No.: 247,622

[52] U.S. Cl. ........................ 325/53, 325/31, 325/52, 325/64, 325/65, 325/308, 325/309, 178/DIG. 13, 328/103, 328/165

[51] Int. Cl. .............................................. H04b 1/00

[58] Field of Search .......................... 325/31, 51–55, 325/62–65, 67, 308, 309, 363; 178/5.4 TE, DIG. 13; 328/103, 165

[56] References Cited

UNITED STATES PATENTS 3,706,040 12/1972 Gargini .............................. 325/308

*Primary Examiner*—Albert J. Mayer
*Attorney*—W. H. MacAllister, Jr. et al.

[57] ABSTRACT

A system for substantially reducing the effects of noise and interference in the upstream transmission path of a two-way CATV system. In one embodiment, a local processing center located at the headend of the cable television system locates a noise source and then commands selected phantom subscriber units in the system to close predetermined radio frequency switches to only allow a desired upstream transmission to be passed to the headend and to switch out all other upstream transmission paths not being used.

17 Claims, 13 Drawing Figures

PATENTED JUL 31 1973

3,750,022

SYSTEM FOR MINIMIZING UPSTREAM NOISE IN A SUBSCRIBER RESPONSE CABLE TELEVISION SYSTEM

BACKGROUND OF THE INVENTION

1. Field of the Invention

This invention relates to cable television systems and particularly to a system for minimizing the effects of upstream noise in a subscriber response cable television system.

2. Description of the Prior Art

Although the term "CATB," as used herein, originally meant Community Antenna Television it has come to represent a much broader field of communications. Within the past decade additional services have been proposed and in some cases actually provided by some CATV systems operators. In the realm of one-way communications (i.e., from a central transmitter to the subscribers), services such as AM and FM radio programs, weather broadcasts and locally originated television programs have been provided as part of the CATV services. With the availability of two-way cable distribution networks a vast number of additional communications needs can be served. The availability of upstream communications channels allows the subscribers of a CATV system to be surveyed or polled for information such as viewing habits or billing and, in addition, allows the subscribers to obtain services which are unrelated to television. Therefore, although the term "CATV" is used herein it should be noted that the term includes two-way communications on a much broader scale but which retains television programming as an important function.

There are several basic techniques for configuring a coaxial cable system for two-way simultaneous transmission. One way is by utilizing separate downstream and upstream cables. Another is by simultaneous bidirectional signaling on a single cable by utilizing frequency multiplexing and two-way amplifiers and filters. A third technique may involve a combination of these two basic techniques. A fourth technique may utilize two or more bidirectional cables, with each bidirectional cable operating with a frequency spectrum different from any other one.

As with any communication system cable television systems are often seriously affected by noise. Such noise may be of the type produced by sources internal to the system (e.g., thermal noise) or interference type noise from sources external to the system (e.g., electric razors). With a two-way cable television system, however, the effect of noise is particularly deleterious to communications in the upstream direction. While a noise problem may be experienced on the downstream transmission paths as well, the effect of noise sources on the communication downstream is less severe for most parts of the system since only those amplifiers in cascade in the signal path contribute noise. The main problem with upstream transmission is that the equipment at each subscriber terminal, as well as each upstream amplifier, in the various branches of the system (even the branches which are not in the signal path) may contribute their internally generated thermal noise to the system. In other words, thermal noise from the upstream amplifiers and subscriber terminals, as well as external interference injected into the CATV system, are all summed in the merging upstream branches and funneled into the headend. Since these noise sources may occur any place in the CATV system, they may degrade the communications upstream by interferring with upstream signals. In fact, the total upstream noise level may be so high that all meaningful upstream communications from the subscribers to the headend site may be destroyed.

At the present time there is no known two-way CATV system in the prior art which solves this upstream noise problem.

It is therefore an object of this invention to provide a novel system for minimizing upstream noise in a two-way CATV system.

Another object of this invention is to provide a system for minimizing the effects of external interference on upstream CATV transmissions.

Another object of this invention is to provide a system for locating and isolating noise sources in the upstream paths of a cable television distribution network.

A further object of this invention is to provide a system for selectively switching out that portion or portions of the upstream paths of a cable distribution network which contains one or more noise sources.

SUMMARY OF THE INVENTION

Briefly, a novel system is provided for isolating upstream noises and switching out all upstream transmission paths containing noises that may interfere with a desired upstream transmission. A local processing center locates the noise sources and commands phantom subscriber units in the system to switch out any unused portion of the CATV upstream paths that contains a detected noise source. The local processing center can also command the phantom subscriber units to switch out all portions of the CATV upstream paths except those portions of the path needed for one or more upstream transmissions. Furthermore, the system has the capability of minimizing the effects of external interference on upstream CATV transmissions.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENT

Figure 1:
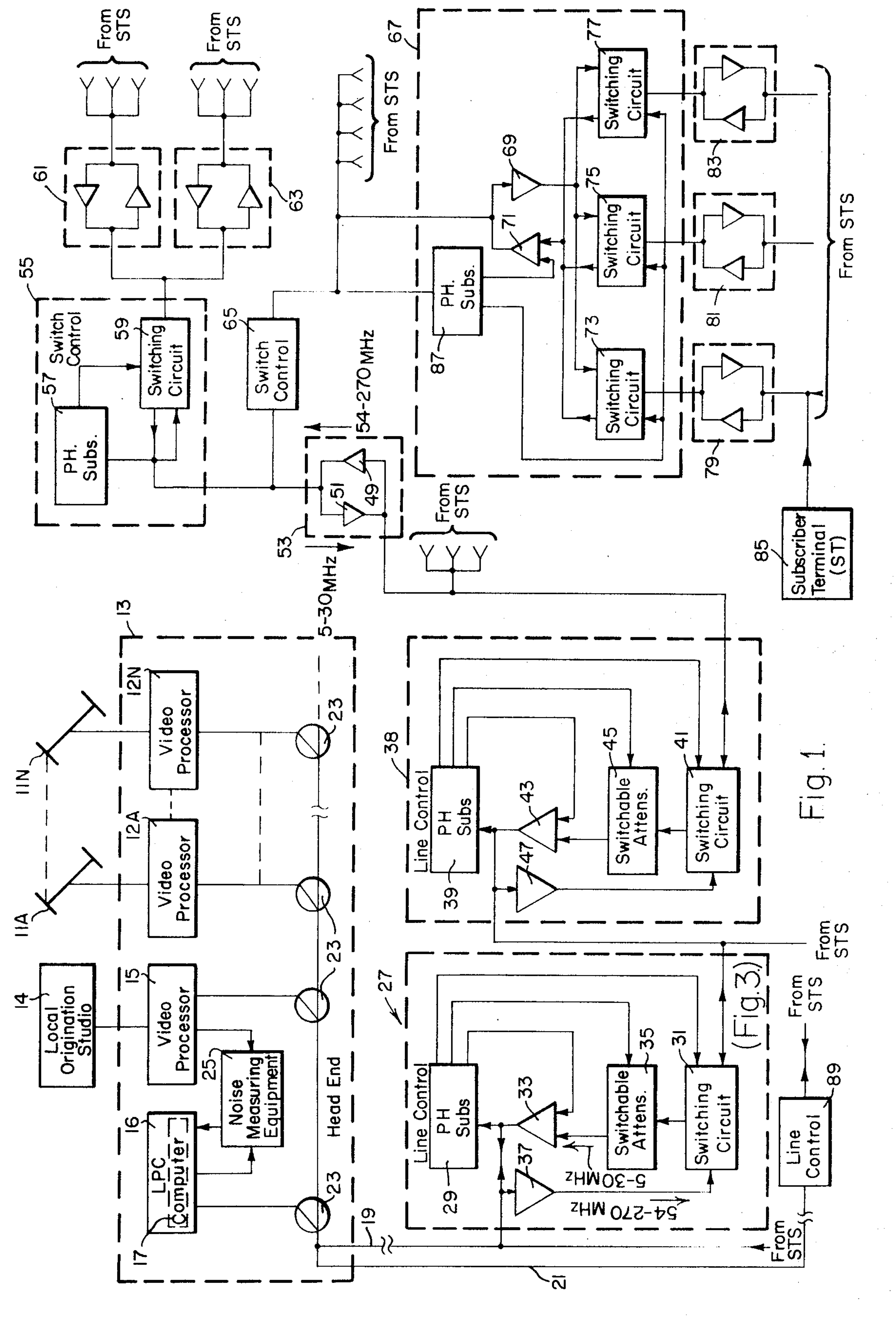
FIG. 1 illustrates a schematic block diagram of a two-way CATV system which incorporates the invention.

Referring now to the drawings, FIG. 1 discloses a two-way CATV (cable television) system which incorporates the invention. Television (TV) and radio broadcast signals transmitted through the air are received by a plurality of elevated receiving antennas 11A through 11N for subsequent processing by a plurality of video processors 12A through 12N, which are located at a headend site 13. Signals from a local origination studio 14, which may be located at some distance from the headend site 13, are supplied for subsequent processing to a video processor 15 at the headend site 13. A local processing center (LPC) 16 at the headend site 13 includes a computer 17. The LPC 16 allows two-way communications between the subscribers and the headend site 13. Each of the outputs of the LPC 16 and video processors 12A through 12N and 15 is frequency multiplexed onto two main trunk lines 19 and 21 with the other outputs by way of its associated directional coupler 23 for the downstream transmission. Upstream transmissions from subscriber terminals (STs) are passed through the main trunk lines 19 and 21 for selective frequency reception by the LPC 16 and the video processor 15. Noise measuring equipment 25 monitors and measures, in a conventional manner, the noise levels of the upstream transmissions to the LPC 16 and video processor 15. Any noise exceeding a preselected threshold level causes the equipment 25 to generate a signal which is used by the LPC 16 to control subsequent upstream transmissions to minimize the reception of upstream noise and interference.

Figure 2:
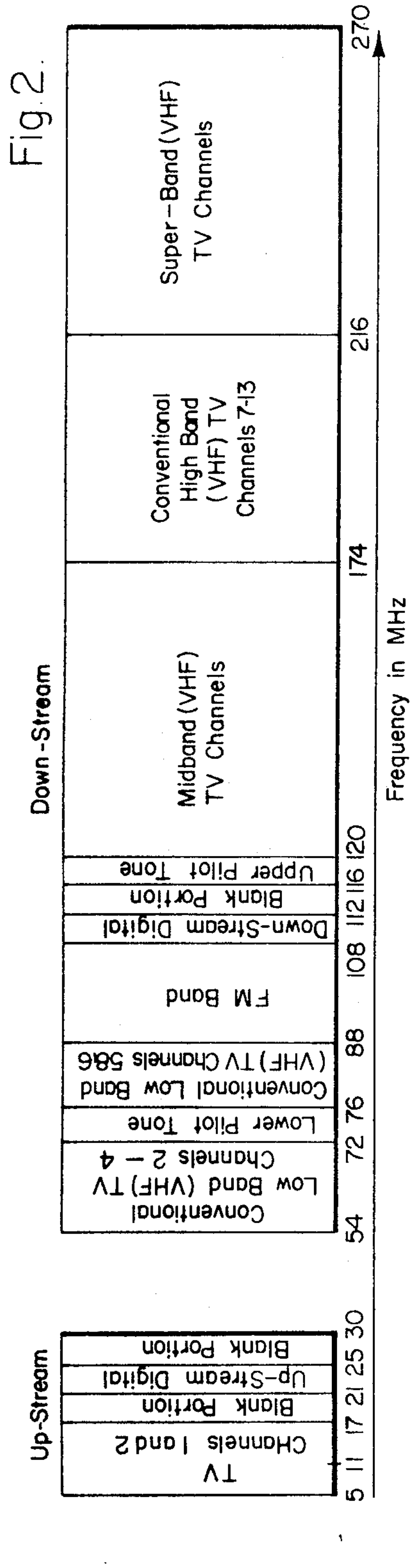
FIG. 2 illustrates a possible frequency spectrum allocation of signals in a two-way CATV system.

FIG. 2 illustrates one possible allocation of signals in the frequency spectrum of the two-way CATV system. The very high frequency (VHF) range from 54 to 270 MHz is employed in the downstream direction from headend site 13 to the subscribers. The high frequency (HF) range from 5 to 30 MHz is employed in the upstream direction from the subscribers to the headend site 13.

The conventional "off-the-air" VHF television channels 2 through 6 and 7 through 13 can, if desired, be transmitted downstream at their assigned frequencies from 54 to 88 and 174 to 216 MHz, respectively. The ordinarily unoccupied frequency band from 72 to 76 MHz can be utilized for a lower pilot tone for testing or control purposes. The commercial FM broadcast band can be transmitted in its usual location from 88 to 108 MHz.

Downstream digital communications can be transmitted in a 4 MHz band (108 to 112 MHz) just above the FM band. The unassigned or blank portion from 112 to 116 MHz can be used for system tests, while the frequency band from 116 to 120 MHz can be reserved for an upper pilot tone for testing or control purposes. This frequency allocation then leaves space for an additional nine nonstandard midband VHF television channels within the frequency range from 120 to 174 MHz and another additional nine nonstandard super band VHF television channels within the frequency range from 216 to 270 MHz. Some UHF television channels may be downconverted and placed on the cable on some of these additional eighteen nonstandard VHF TV channels.

As shown, the upstream band of frequencies can consist of two TV channels in the 5 to 17 MHz frequency range, an upstream digital data channel in the 21 to 25 MHz frequency range, and unassigned blank portions which may be used as guard bands or test channels in the 17–21 and 25–30 MHz frequency ranges. The two upstream video channels are primarily intended for such applications as the transmission of cablecasting signals from a remote studio located anywhere along the cable system back to the headend for retransmission throughout the entire CATV system. The upstream digital data channel enables any of the subscribers to communicate with the LPC 16 at the headend site 13.

A preferable communications method for the downstream digital communications is a Manchester encoded frequency shift keying (FSK) modulated signal on a 110 MHz carrier. Digital FSK is preferable for this downstream transmission because it minimizes the complexity of the numerous subscriber set receivers. The upstream digital communications preferably employs digital phase shift keying (PSK) on a 23 MHz carrier. This choice of PSK is desirable to minimize the complexity of the numerous subscriber set transmitters utilized in a two-way CATV system.

It is understood, of course, that the types of transmissions, frequencies and frequency ranges described in relation to FIGS. 1 and 2 are for the purpose of explanation only and should not be understood to limit the scope of the present invention. The exemplary frequencies mentioned above correspond roughly to the bandwidths of presently available commercial CATV equipment.

Returning to the description of the embodiment of FIG. 1, the downstream transmission of the TV band and digital signals is sent through the main trunk line 19 into a line control circuit 27, which is one of the devices which may be used to minimize the reception of upstream noise or interference by the LPC 16 and the video processor 15. A phantom subscriber 29 monitors downstream digital transmissions and responds to commands therefrom for controlling the operation of a switching circuit 31, an upstream amplifier 33 and switchable attenuators 35. A downstream amplifier 37 may be paired with the upstream amplifier 33 to form a two-way amplifier for compensating for cable losses in the system. The downstream amplifier 37 is a broadband amplifier designed to pass the frequencies lying in the downstream transmission band. Upstream amplifier 33 is a broadband amplifier designed to pass those frequencies in the upstream band. The amplifier 33 has its gain controlled by the phantom subscriber 29.

Downstream transmissions on the main trunk line 19 are amplified by the downstream amplifier 37 before being applied to the switching circuit 31. The phantom subscriber 29 controls the switching circuit 31 such that downstream transmissions are readily passed through the circuit 31. At the same time upstream transmissions on the main trunk line 19 are selectively controlled by means of switches and filters in switching circuit 31, as discussed in greater detail hereinbelow in connection with FIG. 3. As a result, none, some or all of the two upstream TV channel transmissions and the upstream digital transmission may be passed through the switching circuit 31 into the input of the switchable attenuators 35. The phantom subscriber 29 controls the attenuation of the switchable attenuators 35 such that the output signal from the switching circuit 31 may be either unattenuated or attenuated to a desired level before it is amplified by the upstream amplifier 33.

In normal operation, the switchable attenuators unit 35 does not attenuate the signal from the switching circuit 31 before applying the signal to the upstream amplifier 33. However, the phantom subscriber 29 may be commanded by the LPC 16 to attenuate the output signal from the switching circuit 31, as part of the operation explained in relation to FIG. 5, to increase the signal-to-interference ratio when an externally generated interference is present in the CATV system.

In the downstream transmission the output of the line control 27 may be applied to a plurality of subscriber terminals (STs) before it is applied to another line control 38, which is similar to the line control 27. The line control 38 contains a phantom subscriber 39, a switching circuit 41, an upstream amplifier 43, switchable attenuators 45 and a downstream amplifier 47, all of which respectively correspond in structure and operation to the corresponding units 29, 31, 33, 35 and 37 in the line control 27.

Downstream transmissions by way of the line control 38 are applied to additional subscriber terminals (not shown) before being amplified by a fixed gain downstream amplifier 49. A fixed gain upstream amplifier 51 is parallel-coupled to the downstream amplifier 49 to form a fixed gain two-way amplifier unit 53. The downstream transmission is then applied to a switch control 55 wherein a phantom subscriber 57 samples the downstream transmission in order to control a switching circuit 59 in the same manner specified in relation to the phantom subscriber 29 and switching circuit 31 in the line control 27. The downstream transmission from the switch control 55 is applied in parallel through two-way amplifier units 61 and 63, which are each similar to the two-way amplifier 53, for further amplification before being applied to additional subscriber terminals (not shown).

The downstream output from the two-way amplifier 53 is also applied through a switch control 65, similar to the switch control 55, to other subscriber terminals as well as to a multiple switch control 67. The multiple switch control contains a fixed gain downstream amplifier 69 and a variable gain upstream amplifier 71 which respectively correspond to the amplifiers 37 and 33 in the line control 27. The amplified output from the downstream amplifier 69 is applied to switching circuits 73, 75 and 77, the outputs of which are then respectively applied to fixed gain two-way amplifier units 79, 81 and 83. Each of the switching circuits 73, 75 and 77 corresponds to the switching circuit 31, while each of the amplifier units 79, 81 and 83 corresponds to the amplifier unit 53. The amplified downstream transmissions from the amplifier units 79, 81 and 83 are applied to further subscriber terminals, with the output of the amplifier unit 79 also being applied to the subscriber terminal 85.

A phantom subscriber 87 in the multiple switch control 67 controls the gain of the upstream amplifier 71 in response to downstream transmissions and also controls the operation of each of the switching circuits 73, 75 and 77 in a manner similar to that described in relation to the phantom subscriber 29, the amplifier 33 and the switching circuit 31 in the line control 27. The components in the multiple switch control 67 therefore present a modified version of the line control 27 in that switchable attenuators, similar to the switchable attenuators 35, are not shown, and the phantom subscriber 87 is used to control several switching circuits rather than only one.

It should be noted at this time that, in general, the upstream transmissions require less amplification than the downstream transmissions since transmission line losses are generally lower at lower frequencies. As a result, it is not necessary that two-way amplifier units, such as the unit 53, be used throughout the system. In some cases a downstream amplifier may be bypassed in the upstream direction by an upstream bandpass filter (not shown) rather than by an upstream amplifier.

In the system discussed above, the LPC 16 constantly and sequentially interrogates, via the downstream digital transmission channel indicated in FIG. 2, all of the subscriber terminals (STs) to pick up any requests or responses that the subscribers may have made. Subscriber requests for TV program selection, shopping information or purchases emergency alarms, special subscriber aids and requests, etc., may be made. Also, the LPC 16 can, by means of these interrogations, poll the subscriber's TV sets to check which programs are being viewed and can solicit the opinions of subscriber-viewers. Upon being interrogated by the LPC 16, each subscriber terminal responds in its preselected time sequence by transmitting the subscriber's request or response back to the LPC 16, via the upstream digital transmission channel indicated in FIG. 2. Upon receiving the upstream digital transmission from a subscriber, the LPC can utilize the response, grant the subscriber's request if the subscriber is authorized to receive it, automatically bill and send confirmation to the subscriber for a requested subscription TV program or service.

Downstream transmissions, as well as upstream transmissions, can also be transmitted between the headend site 13 and other subscriber terminals by means of the main trunk line 21 and a line control 89, similar to the line control 27. A line control unit will now be explained in more detail by referring to FIG. 3.

Figure 3:
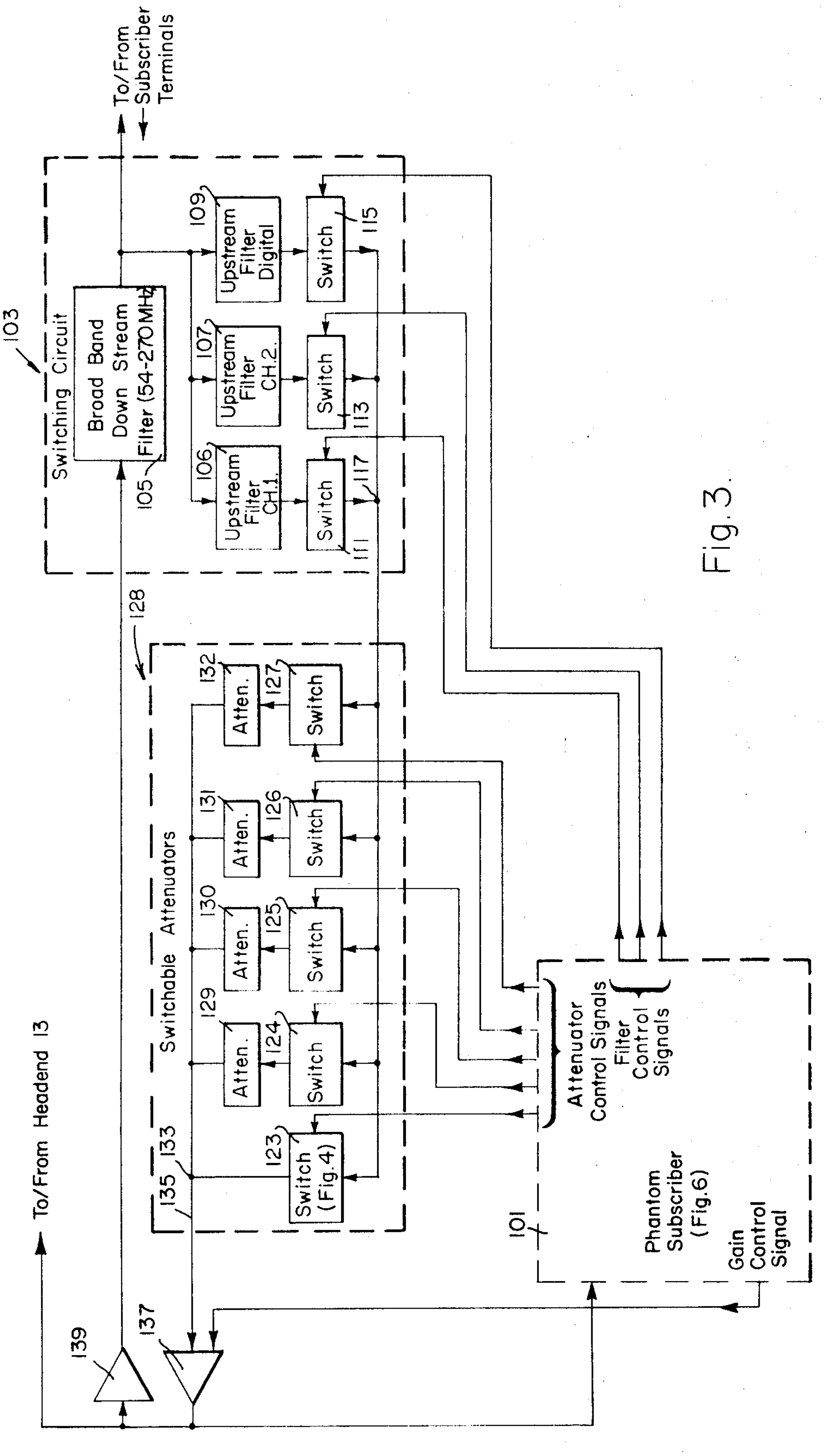
FIG. 3 is a schematic block diagram of one of the line control circuits of FIG. 1.

In FIG. 3 a phantom subscriber 101 monitors downstream digital transmissions from the headend site 13 and in response thereto selectively generates attenuator control signals, filter control signals and a gain control signal. At the same time that downstream transmissions are being made, upstream video or digital transmissions or both may be made from one or more subscriber terminals. These upstream transmissions enter a switching circuit 103 where they are blocked by a broadband downstream filter 105 since they lie outside of its passband of 54 to 270 MHz. These upstream transmissions, however, are applied to upstream filters 106, 107 and 109, which pass TV or digital transmissions within their passbands for upstream TV channel No. 1 signals, upstream TV channel No. 2 signals, and upstream digital signals, respectively. The outputs of the filters 106, 107 and 109 are respectively coupled through RF switches 111, 113, and 115 to a common junction point 117, and from there to each of the inputs to RF switches 123 through 127 of switchable attenuators 128.

The filter control signals from the phantom subscriber 101 are applied to the switches 111, 113, and 115 to control the on or off operation of these switches such that all, some or none of the switches 111, 113 and 115 may be turned on at any given time. With all of the switches 111, 113 and 115 turned on, all three upstream transmissions may be simultaneously applied to the input of each of the RF switches 123 through 127. However, in certain situations, it may be desirable to turn off some or all of the switches 111, 113 and 115 to minimize the amount of upstream noise and/or interference received by the headend site 13.

Attenuator control signals from the phantom subscriber 101 are respectively applied to the switches 123 through 127 to control the on and off status of these switches such that only one of these switches is on at any given time. A plurality of attenuators 129 through 132 are respectively coupled to the switches 124 through 127 in order to attenuate the output from the switches 124 through 127 by different amounts. The output terminals of the attenuators 129 through 132, along with the output terminal of the switch 123, are coupled through a common junction point 133 on a common lead 135 to an upstream amplifier 137. Any upstream transmission from the switchable attenuators 128 is amplified by the upstream amplifier 137 before being sent toward the headend site 13. The gain control signal from the phantom subscriber may be an analog signal which is used to change the gain of the upstream amplifier 137 to one of a plurality of different levels, as commanded by the LPC 16.

A downstream amplifier 139 compensates for cable losses in the CATV system by amplifying downstream transmissions from the headend site 13 before applying them through the broadband downstream filter 105 toward the subscriber terminals. It should be noted that downstream transmissions completely bypass circuits in the switchable attenuators 128, and are therefore unaffected by the operation thereof.

Figures 4, 5:
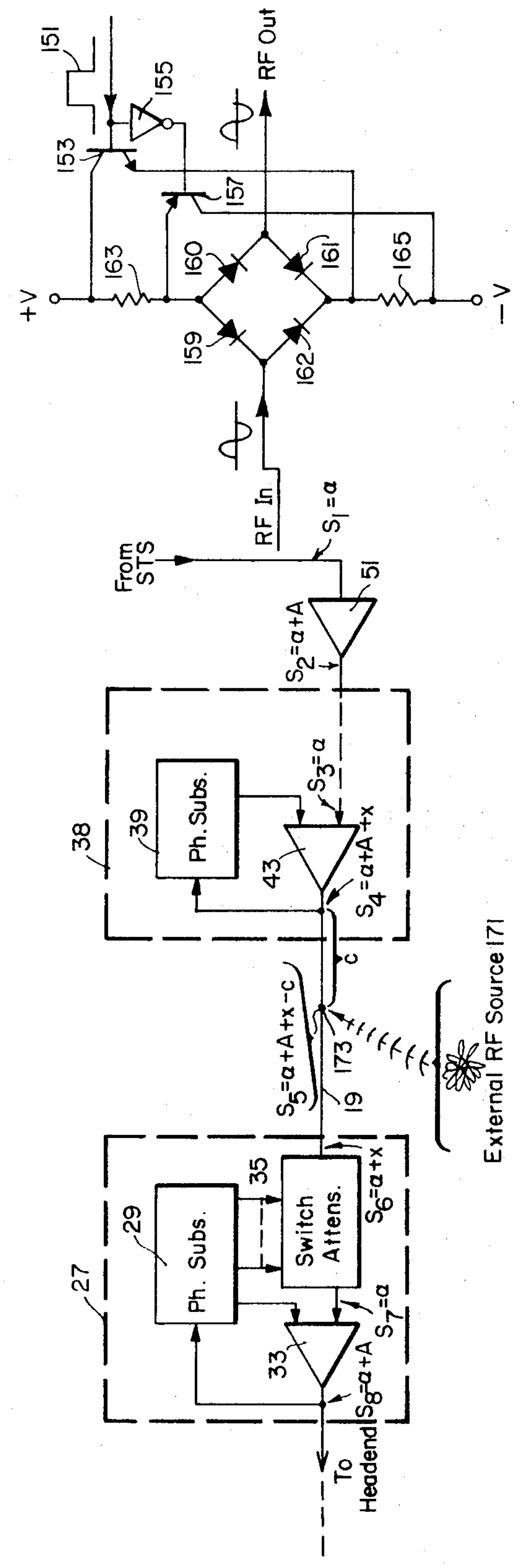
FIG. 4 is a schematic circuit diagram of one of the RF switches of FIG. 3.
FIG. 5 is a schematic circuit diagram of one arrangement for minimizing interference and noise on a CATV upstream transmission.

One type of RF switch, which may be utilized in the mechanization of the switches 111, 113, 115, 123, 124, 125, 126 and 127, is illustrated in FIG. 4. In FIG. 4 a control signal, shown by the waveform 151, is applied directly to the base of an NPN transistor 153 and also through a logical inverter 155 to the base of a PNP transistor 157. A diode bridge composed of the diodes 159, 160, 161 and 162 has the junction of the commonly connected anodes of the diodes 159 and 160 coupled through a resistor 163 to a positive potential +V, and the junction of the commonly connected cathodes of the diodes 161 and 162 coupled through a resistor 165 to a negative potential −V. The RF input is applied to the junction of the cathode of the diode 159 and the anode of the diode 162, while the RF output is taken from the junction of the cathode of the diode 160 and the anode of the diode 161. To complete the connections for the circuit of FIG. 4, the collector-emitter region of the transistor 153 is coupled between the positive potential +V and the junction of the diodes 161 and 162, while the collector-emitter region of the transistor 157 is coupled between the negative potential −V and the junction of the diodes 159 and 160.

In operation, whenever the waveform 151 is in a logical "0" state, both of the transistors 153 and 157 are turned off. In this condition, all of the diodes 159 through 162 are forward biased, thereby permitting bias current to flow through the diodes. If a positive RF current is then applied to the junction of the diodes 159 and 162, current flows through the diode 162 and the voltage drop across the resistor 165 increases by the difference between the amplitudes of the input voltage and the voltage drop across the diode 162. the output voltage also increases in a positive direction by an amount approximately equal to the increase in the input voltage, such that the voltage output is equal to the sum of the input voltage plus the voltage drop across the diode 161 minus the voltage drop across the diode 162. The result is approximately equal to the input voltage if the voltage drop across the diode 162 is approximately equal to the voltage drop across the diode 161.

In a similar manner, if a negative RF current is applied to the junction of the diodes 159 and 162 when the waveform 151 is in a logical "0" state, current flows through the diode 159 and the voltage drop across the resistor 163 increases by the difference between the amplitudes of the input voltage and the voltage drop across the diode 159. The output voltage also increases in a negative direction by an amount approximately equal to the increase in the input voltage such that the voltage output is equal to the sum of the input voltage plus the voltage drop across the diode 160 minus the voltage drop across the diode 159. The output voltage is approximately equal to the input voltage if the voltage drop across the diode 159 is approximately equal to the voltage drop across the diode 160.

When the control signal 151 is in a logical "1" state, both of the transistors 153 and 157 are turned on. The conduction of the transistor 153 from +V through the resistor 165 to −V back-biases the diodes 161 and 162, while the conduction of the transistor 157 from +V through the resistor 163 −V reverse-biases the diodes 159 and 160. As a result, no appreciable current will flow through the resistors 163 and 165, and no RF output developed, when the control signal is in a logical "1" state. The diode bridge can be made to switch very rapidly with little loss between the input and output junctions.

Returning again to the operation of the system of FIG. 1, if an RF generator is creating a strong electromagnetic field in the vicinity of a particular portion of the system, the RF energy picked up by the cable, amplifiers and associated hardware may be sufficient to cause an interference condition. This RF interference condition can result from external sources such as electrical household items (washers, driers, vacuum cleaners, drills, etc.), dental or X-ray equipments, machinery at industrial locations, etc. When interference originates from a localized external source, portions of the system of FIG. 1 can be utilized to minimize its effect. The procedure for minimizing the effects of such interference basically involves increasing the signal-to-interference ratio on the cable in the region thereof which is subject to the interference pickup. This is accomplished by increasing the signal level on the cable downstream of the region of interference pickup. The signal is thereafter attenuated at a region upstream of the interfering region so as to bring the signal level back to its nominal operating level. The specific implementation of this technique is described hereinbelow for the case of upstream communications. It is recognized, however, that with appropriate modifications, the same technique can be employed for downstream communications.

It is assumed that RF interference is picked up and injected into the main trunk line 19 between the line control 38 and the line control 27. As specified before, the noise measuring equipment 25 in the headend 13 monitors all upstream transmissions to check noise levels and signal-to-noise ratios. This interference or excessive noise causes the noise measuring equipment to generate a signal which is applied to the LPC 16. As a consequence of this signal from the noise measuring equipment 25, the LPC 16 goes into a search mode of operation. During this search mode of operation the LPC sequentially sends messages to command each of the phantom subscribers to selectively open one or more of the three RF switches associated with each of the switching circuits under its control. For example, the LPC 16 may command the phantom subscriber associated with line control 89 to open all of the switches within its corresponding switching circuit. This command will therefore prevent any upstream video or upstream digital transmission on the main trunk line 21 from being transmitted to the LPC 16 or the video processor 15. If no appreciable decrease in the noise measured by the equipment 25 is detected, the source of the interference or noise has immediately been isolated to the main trunk line 19. The line control 89 is then commanded to close or turn on the switches in its switching circuit to restore upstream transmissions from the main trunk line 21. As further steps in the process, the phantom subscribers 87, 57, 39 and 29, as well as additional intermediate phantom subscribers, not shown, can be selectively commanded in that sequence by the LPC 16 to open the corresponding switching circuits under their control to isolate the source of interference or noise. If the interference is still present when the phantom subscriber 87 is commanded to turn off the switching circuits 73, 75 and 77 the source of the interference is known to be somewhere between the input to the phantom subscriber 87 and the headend site 13. By the above procedure the source of interference can be isolated between the line control units 39 and 27.

FIG. 5 illustrates one use that can be made of portions of the adjacent line control units 27 and 38 of FIG. 1 in order to minimize the effects of the RF interference generated by an external RF source 171 and injected into the main trunk line 19. After isolating the location of RF interference pickup to some region 173 on the main trunk line 19 between the line control units 27 and 38, as shown in FIG. 5, the LPC 16 then commands the phantom subscriber 39 to increase the gain, via a gain control signal, of the line amplifier 43. The LPC also commands the phantom subscriber 29 to generate attenuator control signals to cause the switchable attenuators 35 to attenuate the signal by substantially the same amount as the increase in the gain of the line amplifier 43. More specifically, in FIG. 5, assume the following:

$A$ = gain in db of each of the amplifiers 51 and 33 = cable loss in db between the amplifiers 51 and 43 = cable loss in db between the amplifiers 43 and 33 (where there is 0 db of cable loss between the switchable attenuators 35 and the amplifier 33);

$A + X$ = gain in db of amplifier 43;

$I = RF$ interference signal level;

$B = RF$ interference level I in dbmv (decibels above one millivolt) at point 173 along the main trunk line 19;

$C$ = cable loss in db between amplifier 43 and RF interference at point 173;

$X$ = attenuation of switchable attenuators 35;

$S_1 = \alpha$ = signal level in dbmv at input of amplifier 51;

$S_2 = \alpha + A$ signal level in dbmv at output of amplifier 51;

$S_3 = \alpha$ = signal level in dbmv at input of amplifier 43;

$S_4 = \alpha + A + X$ = signal level in dbmv at output of amplifier 43;

$S_5 = \alpha + A + X - C$ = signal level in dbmv at point 173;

$S_6 = \alpha + X$ = signal level in dbmv at input of switchable attenuators 35;

$S_7 = \alpha$ = signal level in dbmv at input of amplifier 33; and $S_8 = \alpha + A$ = signal level in dbmv at output of amplifier 33.

The signal-to-interference ratio at the Input of the amplifier 33 is the same as the signal-to-interference ratio at the point 173 of RF interference pickup, since the attenuation between the point 173 and the amplifier 33 has an equal affect on both the signal and interference levels therebetween. Therefore, the signal-to-interference ratio (S/I) at the input of the amplifier 33 is given by the relationship: $S/I = \alpha + A + X - C - B$. If the gain of the amplifier 43 were $A$ (instead of $A + X$) and if the attenuation of the switchable attenuators 35 were 0 db (instead of $X$), the signal-to-interference ratio at the input of the amplifier 33 would be given by the relationship: $S/I = \alpha + A - C - B$. Therefore, increasing the gain of the amplifier 43 by an additional $X$ db and inserting an additional $X$ db of attenuation at the input to the amplifier 33 (via switchable attenuators 35) increases the signal-to-interference ratio by $X$ db. Of course, with no *RF* interference being present in FIG. 5, the amplifier 43 would be operated with a gain of $A$ and the switchable attenuators 35 would be operated with 0 db of attenuation.

In general, other amplifiers (not shown) may exist between the amplifier 43 and the switchable attenuators 35. Since such amplifiers merely compensate for transmission losses, the output signal level of all additional amplifiers inserted between the amplifier 43 and the switchable attenuators 35 are substantially equal to the output signal level of the amplifier 43.

Figure 6:
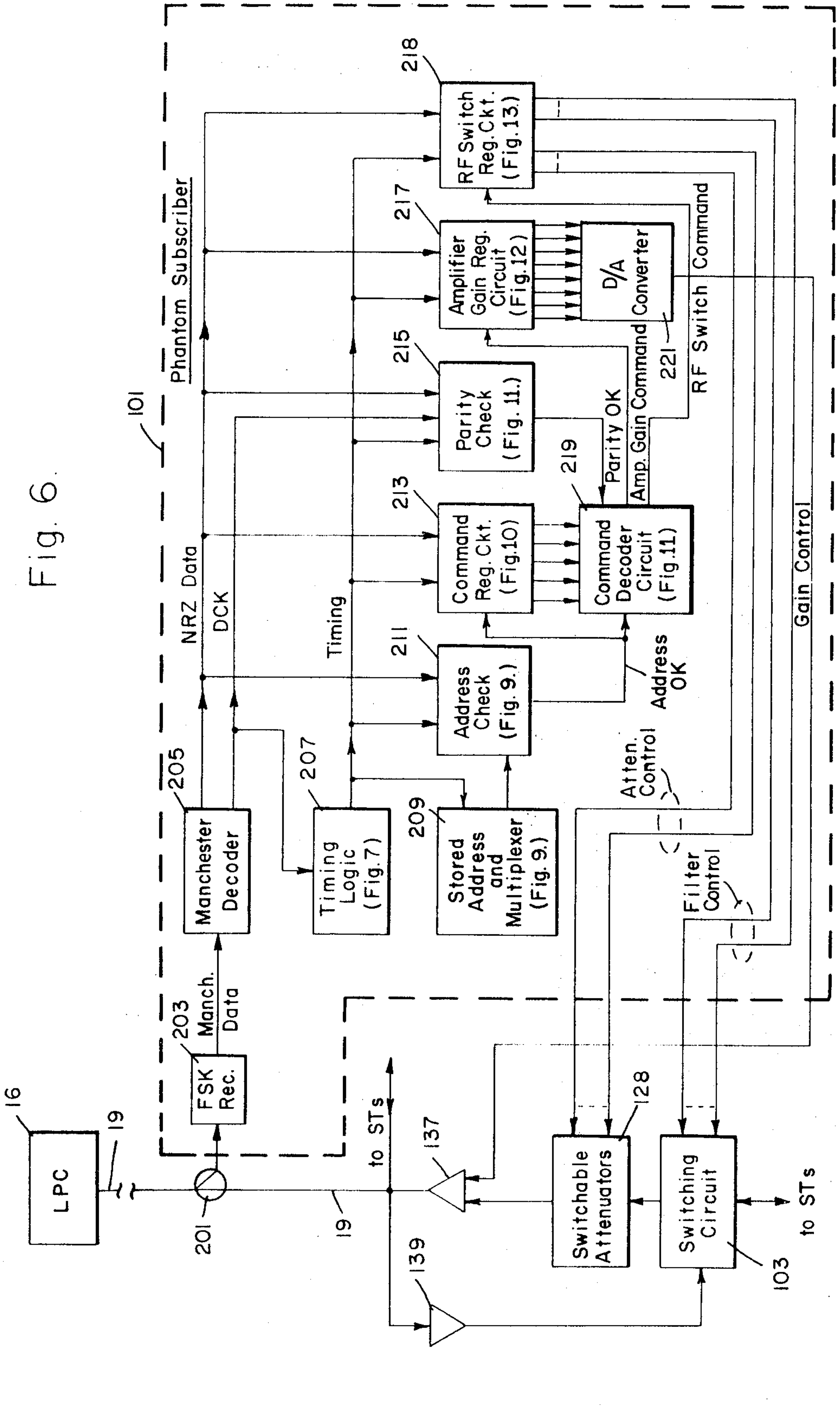
FIG. 6 is a more detailed schematic block diagram of the phantom subscriber of FIG. 3.

The line control of FIG. 3 is illustrated in FIG. 6, with the one mechanization of the phantom subscriber 101 being shown in detail to perform the functions specified in relation to FIGS. 1, 3 and 5. Downstream transmissions from the LPC 16 are sent through the main trunk line 19 and a serially connected tap 201 to subscriber terminals and to the downstream amplifier 139. A portion of the downstream transmission is tapped off from the tap 201 and applied to an FSK (frequency shift keying) receiver 203 in the phantom subscriber 101. The FSK receiver 203 demodulates the downstream transmission to recover the Manchester encoded data. The data from the receiver 203 is then applied to a conventional Manchester decoder 205 which separates the Manchester data into its components of downclocks (DCK) and nonreturn-to-zero (NRZ) data. The downclocks are applied to a parity check circuit 215 and to a timing logic circuit 207, which generates timing waveforms which are in turn applied to a stored address and multiplexer 209, an address check 211, a command register circuit 213, a parity check circuit 215, an amplifier gain register circuit 217 and an RF switch register circuit 218. The NRZ data from the Manchester decoder 205 is also applied to the address check 211, the command register circuit 213, the parity check circuit 215, the amplifier gain register circuit 217 and the RF switch register circuit 218. For illustrative purposes, it is assumed that the NRZ data in the downstream digital message includes one start of message (SOM) bit, 16 address bits, five command information bits, one parity bit and eight command function bits.

In response to the timing waveforms from the timing logic 207, the stored address and multiplexer 209 serially reads out a stored address which, as specified above, may be 16 coded bits in length to uniquely identify the particular phantom subscriber 101. The serial stream of address bits from the stored address and multiplexer 209 is applied to the address check 211 and compared bit by bit with the corresponding 16 bits in the NRZ data, as controlled by the timing signals from the timing logic 207. If the phantom subscriber 101 is being addressed by the LPC 16, the 16 address bits in the NRZ data will be identical with the 16 bits of stored address being read out from the unit 209, and the address check 211 will therefore generate an address OK signal which, in turn, is applied to the command register circuit 213 and to a command decoder circuit 219 in order to enable the circuits 213 and 219 to respond to subsequent bits of NRZ data.

If it is assumed that the phantom subscriber 101 has been addressed by the LPC 16, the subsequent generation of the address OK signal enables the command register circuit 213 to store the five bits of NRZ data which follows the address. As mentioned, these five bits of NRZ data constitute command information which is then applied to the command decoder circuit 219.

For increased reliability, a parity check may be utilized in the 22 bits of NRZ data which include the 16 address bits, the five command information bits and a parity bit. These 22 bits of NRZ data are applied to the parity check 215. For an odd parity check operation the LPC 16 would cause the 22nd bit to be a binary "1" if the 21 bits immediately preceding the parity bit included an even number of binary "1's" for that particular phantom subscriber. In a like manner the 22nd bit would be a "0" in the event that there were an odd number of binary "1's" in the 21 bits immediately prior to the parity bit. For an even parity check operation the 22nd bit would be such that the sum of all the binary "1's" in the aforesaid 22 bits would be an even number.

Assume that an odd parity check has been utilized. The parity check 215 generates a parity OK signal in the event that the parity is all right. The command decoder circuit 219 then responds to the reception of the address OK and parity OK signals by allowing the five bits of command information to be demultiplexed into $2^5$ or 32 different control lines. The command decoder circuit 219 therefore allows the phantom subscriber 101 to be mechanized to perform up to 32 different command functions, with each command function being initiated by a command signal on an associated one of the 32 different control lines. Other possible command functions which could be performed by other circuits (not shown) in the phantom subscriber 101 are: accessory power "on," accessory power "off," transmitter power "on," transmitter power "off," master disable, initialize, data request, meter read, printout numeric, printout alphanumeric, etc. For illustrative purposes only two output control lines are shown in FIG. 6. Of course, more than one control line could be utilized to perform any given command function. For simplicity of explanation, however, each control line here will perform one command function.

An amplifier gain command (a binary "1") is applied from one of the output control lines of the decoder circuit 219 when the gain of the upstream amplifier 137 is to be increased. This amplifier gain command is applied to the amplifier gain register circuit 217 and operates in conjunction with the timing signals from the timing logic 207 to allow the amplifier gain register circuit 217 to read in the next eight command function bits of serial NRZ data following the parity bit. The eight bits of NRZ data read into the amplifier gain register circuit 217 determine the desired gain setting for the amplifier 137 and are read out in parallel and applied to a digital-to-analog (D/A) converter 221. The converter 221 converts the digital gain information into an analog gain control signal which is used, as specified before, to change the gain of the amplifier 137.

An RF switch command (a binary "1") is applied from another one of the output control lines of the decoder 219 when the operation of either or both of the switchable attenuators 128 and the switching circuit 103 is to be changed. This RF switch command is applied to the RF switch register circuit 218 and operates in conjunction with the timing signals from the timing logic 207 to allow the RF switch register circuit 218 to read in the next eight command function bits of serial NRZ data following the parity bit. The eight bits of NRZ data read into the RF switch register circuit 218 are read out in parallel, with five of the bits being used as attenuator control signals to control the attenuation of the switchable attenuators 128, and three of the bits being used to control the upstream transmissions through the switching circuit 103.

It should be noted at this time that when an amplifier gain command is received, the following eight command function bits of NRZ data, which are read into the amplifier gain register circuit 217, pertain only to digital gain information. In a like manner, when an RF switch command is received, the following eight bits of NRZ data, which are read into the RF switch register circuit 218, pertain only to controlling the "on" or "off" status of each of the RF switches in the switchable attenuators 128 and in the switching circuit 103.

Each message of NRZ data directed to any given phantom subscriber such as the unit 101 may contain only one five-bit command followed (after the parity bit) by its associated eight-bit command function, or may contain two or more commands with each command followed by its associated command function. Of course, a longer message would be required if the message were to contain two or more commands and their associated command functions. To simplify the following discussion only one command per message will be used, since both of the above approaches, as well as various obvious modifications of FIG. 6, lie within the purview of this invention.

In order for the line control units 27 and 38 of FIG. 1 to minimize the effects of external interference, as discussed in relation to FIG. 5, it may be necessary for the phantom subscriber 39 to increase the gain of the upstream amplifier 43 without allowing the switchable attenuators 45 to attenuate the signal, while at the same time it may be necessary for the phantom subscriber 29 to cause the switchable attenuators 35 to increase the attenuation of the signal without increasing the gain of the upstream amplifier 33. The various circuits of the phantom subscriber 101 of FIG. 6 will now be described in more detail by referring to FIGS. 7 through 12.

Figures 7, 13:
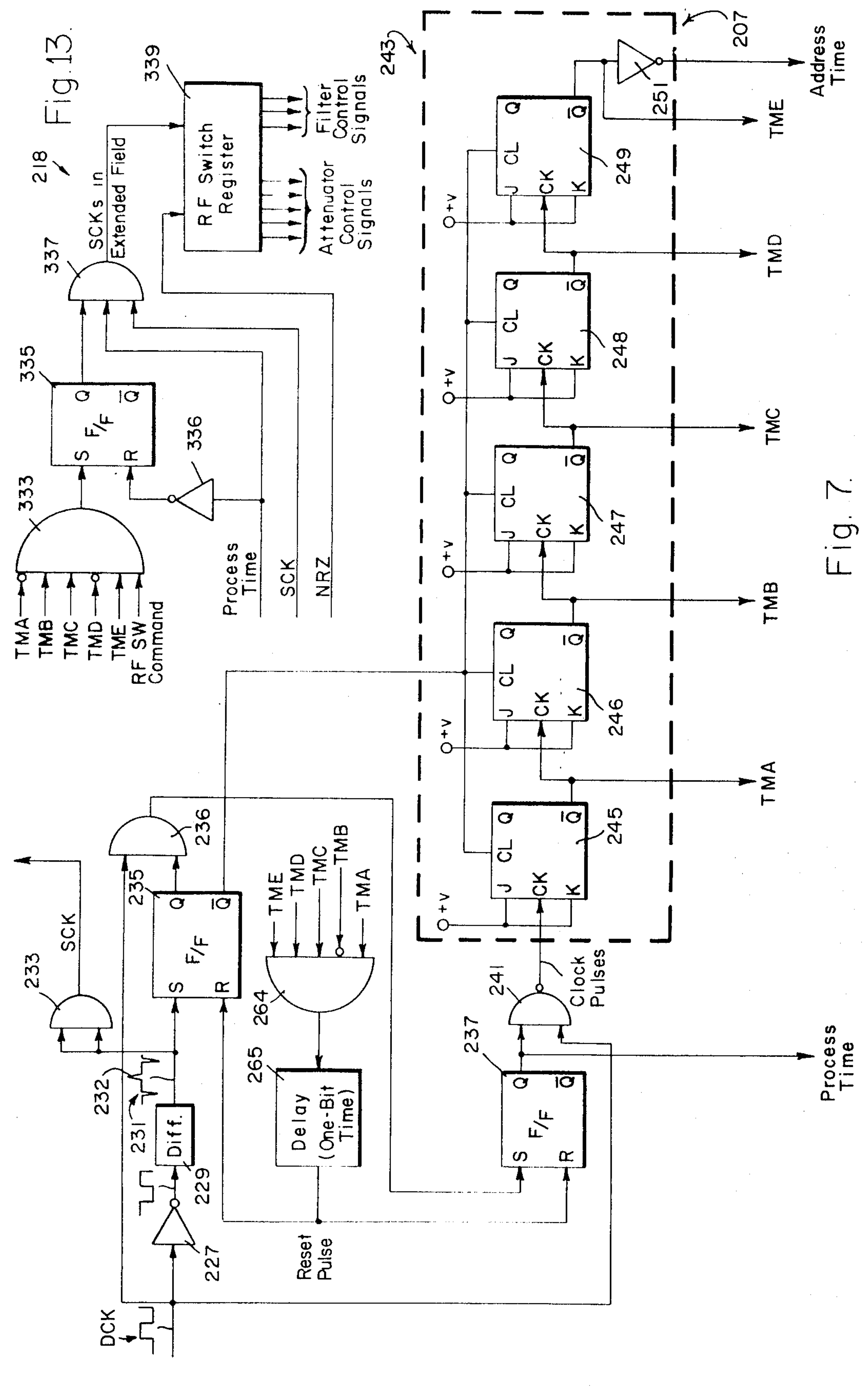
FIG. 7 is a schematic block diagram of the timing logic circuit of FIG. 6.
FIG. 13 is a schematic block diagram of the RF switch register circuit of FIG. 6.
Figure 8:
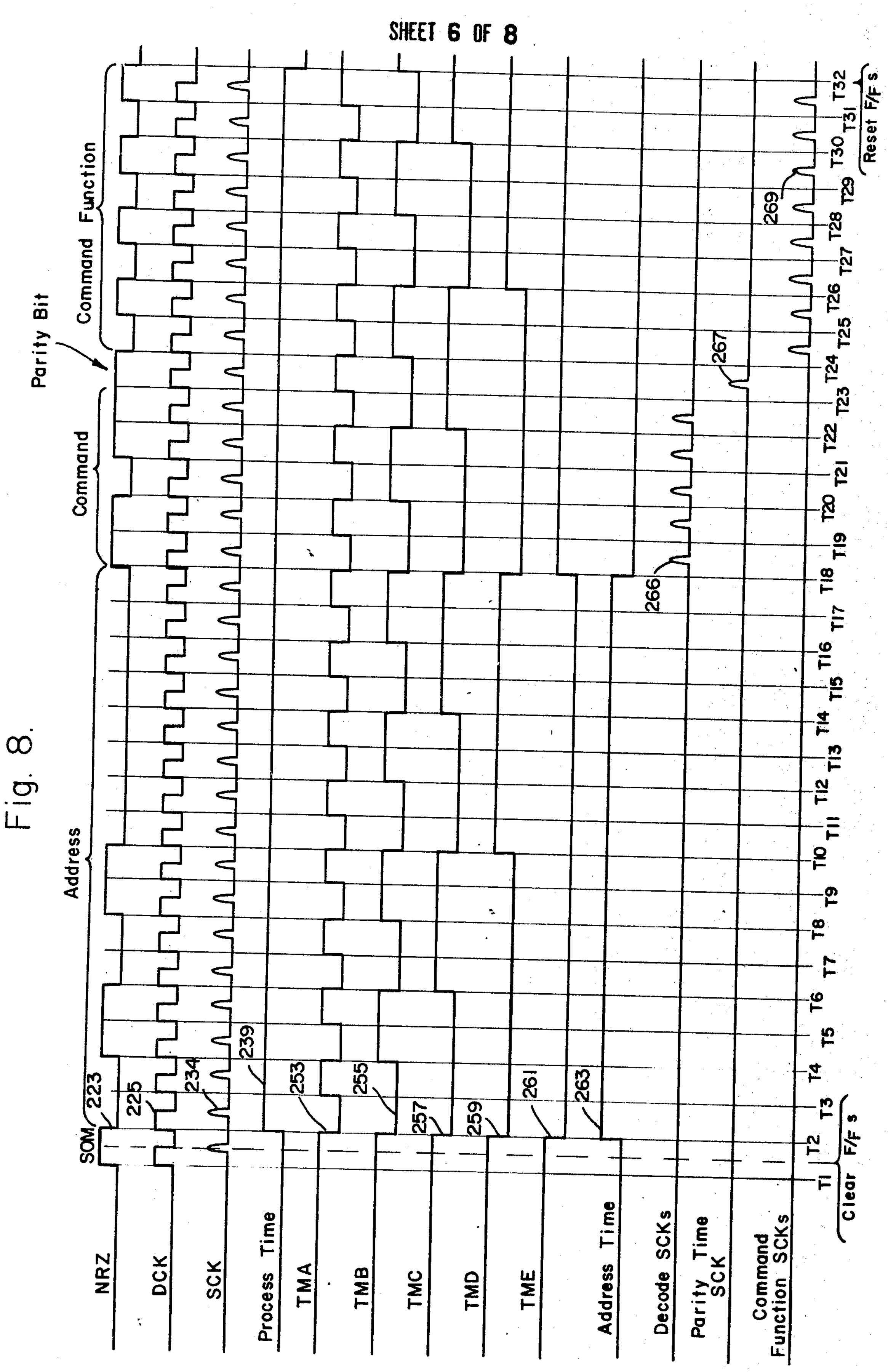
FIG. 8 illustrates waveforms useful in explaining the operation of the circuits of FIGS. 6, 7 and 9 through 13.

FIG. 7 illustrates one mechanization of the timing logic 207 of FIG. 6. The operation of the circuit of FIG. 7 can best be explained by also referring to the waveforms of FIG. 8. FIG. 8 illustrates the waveforms that are generated during the times $T_1$ through $T_{32}$, during which times the NRZ data illustrated in the waveform 223 and the downclocks (DCK) illustrated in the waveform 225 are received. The times $T_1 - T_{32}$ encompass the period of time during which a transmission or message from the LPC 16 is being received by the phantom subscriber 101. The message illustrated in the waveform 223 is composed of a start-of-message (SOM) bit, 16 address bits, five command bits, one parity bit and eight command function bits in an extended field to define a specific function for a specific command, although a different format could have been chosen. The first downclock, occurring at the same time as the SOM bit, is utilized to clear flip-flops and initiate the timing operation in the timing logic circuit 207, in the following manner.

Each of the downclocks 225 is sequentially inverted by an inverter 227 and differentiated by a differentiator 229 to develop a differentiated waveform 231 having a positive polarity spike of voltage 232. The first and all subsequent positive voltage spikes generated from the down-clocks are used to cause an AND gate 233 to generate super-clocks (SCK), illustrated by the waveform 234 in FIG. 8. The first differentiated positive voltage spike developed from the first downclock, is also used to set a flip-flop 235 to cause its Q output to go to a "1" state. The "1" state from the Q output of the flip-flop 235 is applied to the lower input of an AND gate 236. The "0" state output from the $\overline{Q}$ output of the flip-flop 235 is used at this time (between times $T_1$ and $T_2$) to clear all of the J–K flip-flops illustrated in FIG. 7 to cause their Q outputs to go to a "0" state.

The positive-going portion of the second downclock applied to the timing logic 207 is applied to the upper input of the AND gate 236. Since both inputs to the AND gate 236 are in a binary "1" state at the start of the second down-clock, the AND gate 236 develops a "1" state output which sets a flip-flop 237 so that its Q output goes to a "1" state. The Q output from the flip-flop 237 generates the process time waveform 239 illustrated in FIG. 8. This process time waveform 239 is applied to the upper input of a NAND gate 241. Downclocks occurring during the "1" state process time are applied to the lower input of the NAND gate 241. The NAND gate 241 inverts the downclocks occurring within the period of the process time waveform 239 to develop negative-going clock pulses which are utilized by a binary counter 243 to generate additional timing waveforms. The binary counter 243 is shown comprised of five sequentially coupled J–K flip-flops 245 through 249. The $\overline{Q}$ outputs of the flip-flops 245 through 248 are respectively applied to the clock (CK) inputs of the flip-flops 246 through 249. The negative-going clock pulses from the NAND gate 241 are applied to the clock input of the flip-flop 245. The J–K flip-flops 245 through 249 have each of their J and K inputs connected to a positive potential +V, and each of their clear (CL) inputs connected to the $\overline{Q}$ output of the flip-flop 235, as indicated previously. As a result, each of the flip-flops 245 through 249 will change its output state when a negative polarity voltage is applied to its clock (CK) input. These flip-flops 245 through 249, therefore, function together as a binary counter which counts each negative-going clock pulse from the NAND gate 241. The $\overline{Q}$ outputs of the flip-flops 245 through 249 respectively develop the waveforms TMA, TMB, TMC, TMD and TME in a conventional manner. The $\overline{Q}$ output of the flip-flop 249 is also inverted by an inverter 251 to develop an address time waveform which is only utilized during the period $T_2$–$T_{18}$ when the 16 address bits of NRZ data are being received. The TMA, TMB, TMC, TMD, TME and address time signals are respectively illustrated by the waveforms 253, 255, 257, 259, 261 and 263 in FIG. 8.

The TMA, TMB, TMC, TMD and TME waveforms are applied to an AND gate 264, which has its TMB input inverted. At one bit time before the completion of the downstream message to the phantom subscriber 101 (FIG. 6), which occurs at time $T_{31}$, the TMA, TMB, TMC, TMD and TME waveforms are respectively in binary 1, 0, 1, 1 and 1 states. Therefore, at time $T_{31}$ the AND gate 264 generates a "1" state signal, which is delayed one bit time by a delay circuit 265 so that a reset pulse will be produced at the output of the delay circuit 265 at the time $T_{32}$. This reset pulse is then used to reset the flip-flops 235 and 237 to terminate the operation of the timing logic 207 until another message is received from the LPC 16. The remaining waveforms 266, 267 and 269 in FIG. 8 illustrate the superclocks (SCK) which are utilized during the decode period, parity time, and command function time, all of which are explained hereinbelow.

Figures 9, 10:
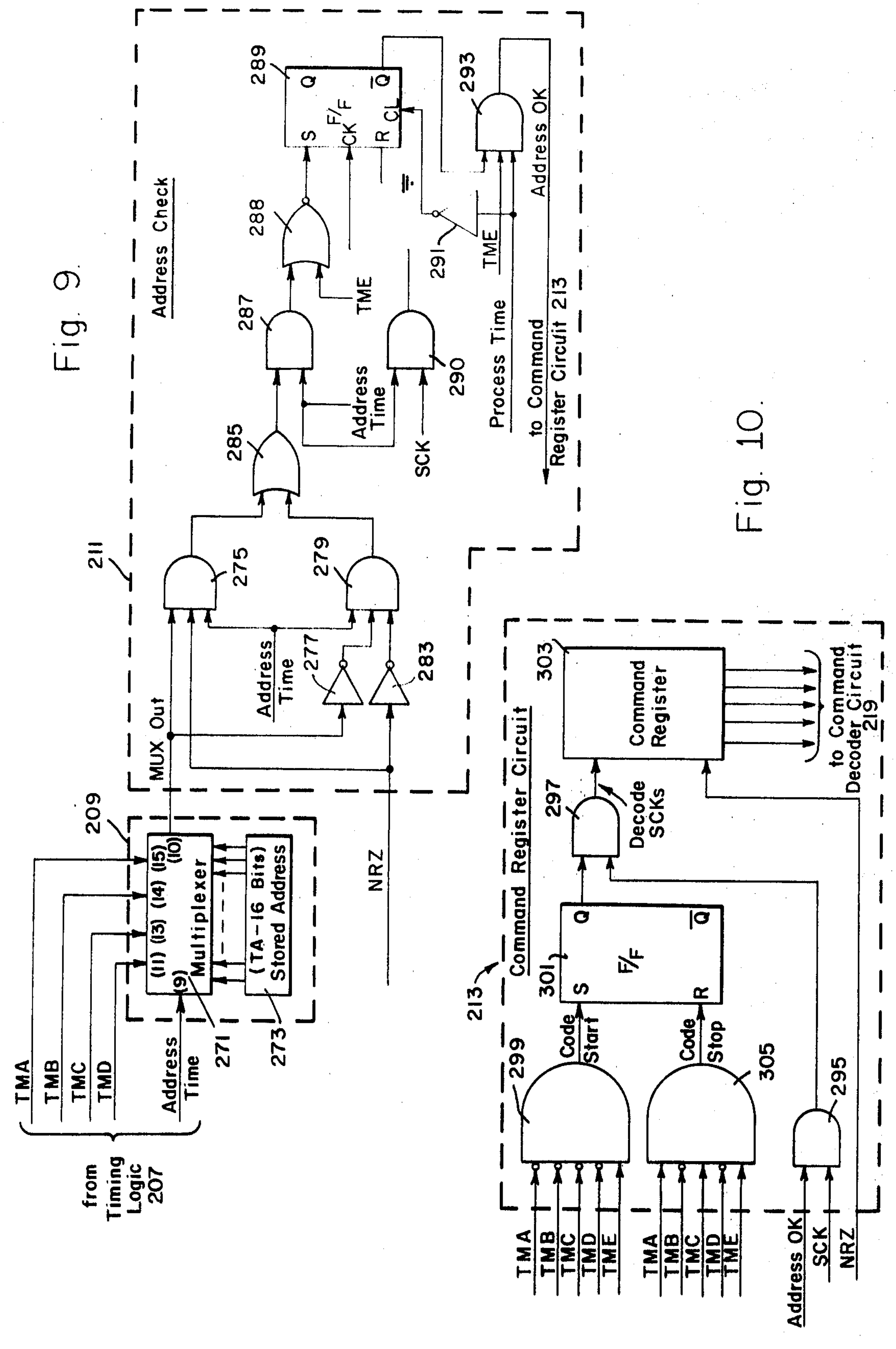
FIG. 9 is a schematic block diagram of the stored address and multiplexer and address check circuits of FIG. 6.
FIG. 10 is a schematic block diagram of the command register circuit of FIG. 6.

Referring now to FIG. 9, the stored address and multiplexer 209 and the address check 211 of FIG. 6 are illustrated in more detail. The TMA, TMB, TMC, and TMD waveforms 253, 255, 257 and 259 from the timing logic 207 are respectively applied to terminals (15), (14), (13) and (11) of a multiplexer circuit 271 to provide the proper timing therefor. The multiplexer 271 may be similar to the data selectors/multiplexers discussed from page 10–1 to page 10–4 of *The Integrated Circuits Catalog for Design Engineers*, First Edition, of Texas Instruments, Inc. A stored address circuit 273, which may be a hard-wired circuit, a set of switches or a set of flip-flops, supplies 16 bits of data input information to the multiplexer 271 to identify the phantom subscriber 101. The address time waveform 263 is applied to a strobe input (9) of the multiplexer 271 to allow the multiplexer (MUX) to convert the 16 parallel-fed input bits from the stored address 273 into a MUX output of 16 serial bits. The MUX output at output terminal (10) of the multiplexer 271 is applied to a first input of an AND gate 275 and is also inverted by an inverter 277 and applied to a first input of an AND gate 279. The NRZ data is applied to a second input of the AND gate 275 and is also inverted by an inverter 283 and applied to a second input of the AND gate 279. The address time waveform 263 is applied to a third input of each of the AND gates 275 and 279 in order to enable them only during the address time (from $T_2$ to $T_{18}$).

AND gates 275 and 279 function, with the aid of the inverters 277 and 283, to compare the MUX output or terminal address (TA) with the 16 bits of address in the NRZ data on a bit-by-bit basis during the period of the address time ($T_2$–$T_{18}$) of the waveform 263. Whenever corresponding bits of the MUX output and NRZ data are both in a "1" state condition, the AND gate 275 develops a binary "1" which is applied through an OR gate 285 to the upper input of an AND gate 287. The address time waveform 263 is applied to the lower input of the AND gate 287 to enable the AND gate only during the address time. Whenever corresponding bits of the MUX output and NRZ data are both in "0" states, these corresponding "0" states are inverted by the inverters 277 and 283 to cause the AND gate 279 to develop and apply a binary "1" to the lower input of the OR gate 285. In response to the application of a "1" state signal to either of its inputs, the OR gate 285 will apply a "1" state signal to the upper input of the AND gate 287. As a result, the AND gate 287 will develop a binary "1" for each of the 16 address bits occurring during the address time (times $T_2$–$T_{18}$) if the phantom subscriber 101 (FIG. 6) is being correctly addressed.

The output of the AND gate 287 is applied to the upper input of a NOR gate 288. The TME waveform 261 is applied to the lower input of the NOR gate 288 to only allow the NOR gate 288 to develop a binary "1" state output during the address time ($T_2$–$T_{18}$) if there is an address fault (an incorrect address). The output of the NOR gate 288 is applied to the set (S) side of a clocked R-S flip-flop 289. The address time waveform 263 and SCK pulses 234 are applied as inputs to an AND gate 290, which has its output terminal coupled to the clock (CK) input of the flip-flop 289. This mechanization assures that the flip-flop 289 can only be set by a "1" output from the NOR gate 288 at the time of any of the SCK pulses occurring within the address time 263. If the flip-flop 289 has not been set before the end of the address time 263, it will remain in a "reset" condition until at least the next time the Manchester decoder 205 (FIG. 6) detects another downstream message. To prevent the flip-flop 289 from being reset by a SCK pulse during the address time, the reset (R) terminal of the flip-flop 289 is grounded. To assure that the Q output of the flip-flop 289 is in a "1" state (a "reset" condition) at the start of each downstream message, the process time waveform 239 is inverted by an inverter 291 and applied to the clear (CL) input of the flip-flop 289 to clear (reset) the flip-flop 289 at time $T_{32}$ of each message. As a result, the flip-flop 289 can only be "set" by the output of the NOR gate 288 if there is an address fault within the address time ($T_2$–$T_{18}$).

The $\bar{Q}$ output of the flip-flop 289, as well as the TME and process time waveforms 261 and 239, are applied as inputs to an AND gate 293. It should be recalled that the process time waveform 239 is in a "1" state during the period $T_2$–$T_{32}$, while the TME waveform is in a "0" state during the period $T_2$–$T_{18}$. Therefore, the AND gate 293 can only develop a "1" state address OK signal during the period of time $T_{18}$–$T_{32}$, if no address fault occurred during the period $T_2$–$T_{18}$ within which the 16 address bits of NRZ were received by the phantom subscriber 101.

In operation, the address check 211 basically functions to cause its flip-flop 289 to change from a "reset" to a "set" condition if an address fault occurs at a SCK pulse time within the address time ($T_2$–$T_{18}$). At the end of the address time, $T_{18}$, the output of the AND gate 293 will be in a "1" state (address OK) if the flip-flop 289 has not been set as a result of an incorrect address bit. An incorrect address bit will occur during the address time ($T_2$–$T_{18}$) if a bit in the MUX out (station address) is not in the same binary state as the corresponding address bit in the NRZ data.

When an incorrect address bit occurs, both of the AND gates 275 and 279 will develop "0" outputs and cause the OR gate 285 to develop a "0" output. A "0" output from the OR gate 285 will cause the AND gate 287 to develop and apply a "0" output to the upper input of the NOR gate 288. In response, the NOR gate 288 will develop a "1" output, since the incorrect address bit has caused its upper input to be in a "0" state during the time ($T_2$–$T_{18}$) that the TME waveform 261 is in a "0" state and being applied to its lower input. A "1" state output from the NOR gate 288 will set the flip-flop 289 and cause its $\bar{Q}$ output to go to a "0" state. If the $\bar{Q}$ output of the flip-flop 289 is set to a "0" state, the AND gate 293 will be in a "0" state condition at the time ($T_{18}$) when the TME waveform is going to a "1" state. As a result, a "1" state address OK signal will not be developed by the AND gate 293 if the terminal address does not exactly correspond with the NRZ data during the 16 bits of address time. In a like manner it should be apparent that if the flip-flop 289 has not been set before the TME waveform 261 goes to a "1" state at time $T_{18}$, a "1" state address OK signal will be generated by the address check 211 at the end of the address time ($T_{18}$) to indicate that the phantom subscriber 101 has been correctly addressed. The address OK signal, if generated, will be present during the period $T_{18}$–$T_{32}$. At the completion of the message ($T_{32}$), the inversion by the inverter 291 of the negative-going portion of the process time waveform 239 will cause the flip-flop 289 to be cleared or reset and therefore the output of the AND gate 293 to be changed to a "0" state, thereby terminating the address OK signal.

Assume that the phantom subscriber 101 has been correctly addressed. The address OK signal from the address check 211 is then applied to the command register circuit 213, illustrated in FIG. 10, to allow the circuit 213 to clock-in the five command information bits of NRZ data, occurring within the period $T_{18}$–$T_{23}$, when the phantom subscriber 101 is being correctly addressed by the LPC 16. More specifically, the address OK signal is applied, along with superclocks (SCK), to an AND gate 295 to allow the AND gate 295 to pass the decode superclocks (waveform 266 of FIG. 8) to the lower input of an AND gate 297. The TMA, TMB, TMC and TMD waveforms 253, 255, 257 and 259 are applied to inverting inputs of an AND gate 299 while the TME waveform 261 is applied to a non-inverting input of the AND gate 299. The AND gate 299 will only develop a binary "1" state or "code start" signal when the TMA, TMB, TMC and TMD waveforms are in a "0" state condition and the TME waveform is in a "1" state condition. By referring back to FIG. 8, it is seen that these conditions will only be satisfied at the time $T_{18}$. The "code start" signal that is generated at time $T_{18}$ will set a flip-flop 301 so that its Q output will go to a "1" state. The "1" state Q output of the flip-flop 301 is applied to the upper input of the AND gate 297 to allow the AND gate 297 to pass the five decode superclocks (waveform 266) to a command register 303 during the decode period, which lasts for five bit times ($T_{18}$–$T_{23}$). The NRZ data is also applied to the command register 303. This NRZ data is not stored in the command register 301 until the superclocks are received during the decode period. Only the 5 bits of NRZ data dealing with the command information or commands are desired to be stored in the command register 303. This command register 303 can be, for example, a series of five flip-flops for serial read-in and parallel read-out operation.

At the end of the command or decode period, which occurs at time $T_{23}$, the TMA, TMB, TMC, TMD and TME waveforms are respectively in binary "1," "0," "1," "0," and "1" states. The application of the TMA, TMC and TME waveforms to non-inverting inputs of an AND gate 305 and the application of the TMB and TMD waveforms to inverting inputs of the AND gate 305 therefore causes the AND gate 305 to develop a "code stop" pulse to reset the flip-flop 301 at time $T_{23}$, the completion of the decode period. The resetting of the flip-flop 301 causes its Q output to go to a "0" state to disable the AND gate 297 in order to prevent any additional superclocks from being applied to the command register 303. As a result, only five bits of command information in the NRZ data are clocked into the command register 303 during the decode period. The flip-flop 301 remains in a reset state until the phantom subscriber 101 is correctly addressed again. The five bits stored in the command register 303 are applied in parallel to the command decoder circuit 219 (FIG. 6), which is more fully illustrated in FIG. 11, along with the parity check circuit 215.

Figure 11:
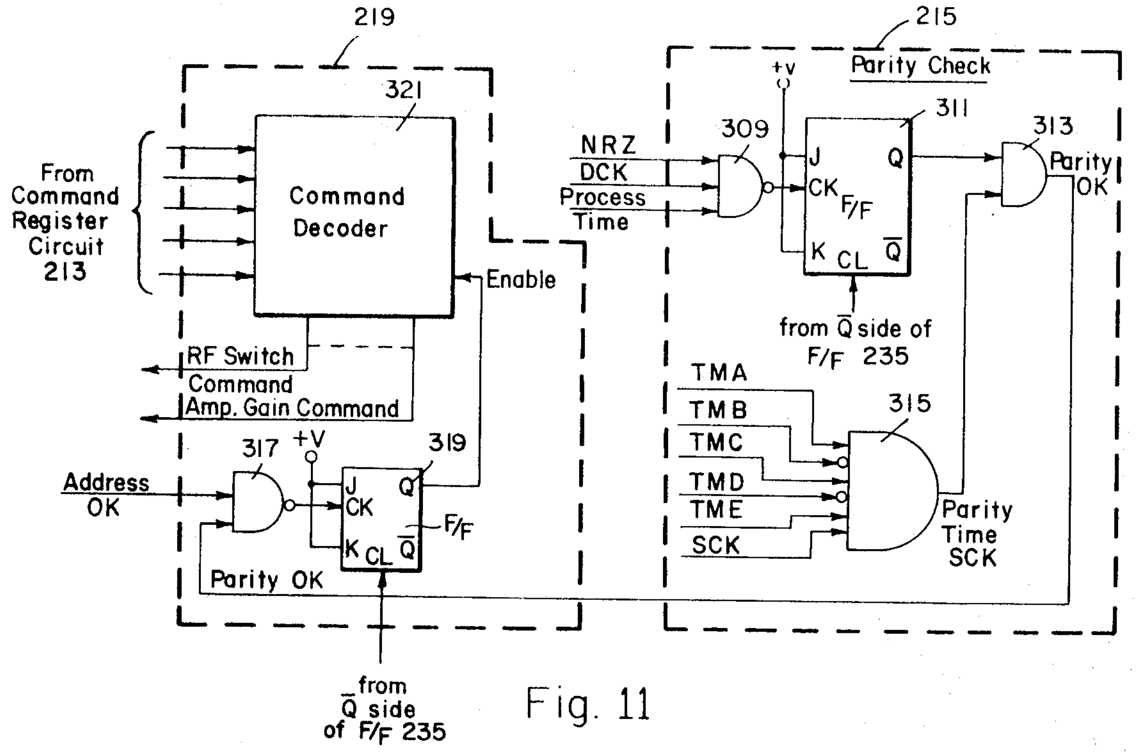
FIG. 11 is a schematic block diagram of the command decoder and parity check circuits of FIG. 6.

Referring now to FIG. 11, the parity check 215 and the command decoder circuit 219 of FIG. 6 are illustrated in more detail. The NRZ data 223, downclocks (DCK) 225 and the process time waveform 239 are applied to a NAND gate 309 which has its output coupled to the clock (CK) input of a J–K flip-flop 311, which is similar in operation to the J–K flip-flop 245 in FIG. 7. The J–K flip-flop 311, like all of the J–K flip-flops in FIG. 7, is cleared by the "0" state output from the $\overline{Q}$ output of the flip-flop 235 in FIG. 7 at the time (between times $T_1$ and $T_2$) when the flip-flop 235 was set by the first differentiated positive voltage spike in the stream of downclocks applied to the timing logic 207.

During the process time ($T_2$–$T_{32}$) the NAND gate 309 develops a "0" state output at each positive-going downclock time that the NRZ data is in a "1" state. Therefore, the Q output of the flip-flop 311 will change its binary state at each positive-going downclock time occurring within the process time that the NRZ data is in a "1" state. The Q output of the flip-flop 311 is applied to the upper input of an AND gate 313. The TMA, TMB, TMC, TMD, TME and super-clock (SCK) signals from the timing logic 207 are applied to the input terminals of an AND gate 315, with only the TMB and TMD inputs being inverted at their associated input terminals of the AND gate 315. During the time ($T_{23}$–$T_{24}$) that the TMA, TMB, TMC, TMD and TME waveforms in FIG. 8 are respectively in binary "1," "0," "1," "0" and "1" states, the AND gate 315 will allow the parity time superclock (SCK) shown by waveform 267 of FIG. 8, to pass through to the lower input of the AND gate 313.

As previously stated, an odd parity check is utilized in this description for illustrative purposes. Therefore, if there is an odd number of binary "1's" in the NRZ data between times $T_2$ and $T_{24}$, the Q output of the flip-flop 311 will go to or be in a "1" state at the time ($T_{23}$–$T_{24}$) that the parity time SCK is generated by the AND gate 315. A correct parity check at the output of the flip-flop 311 therefore allows the AND gate 313 to generate a parity OK signal at the time that the parity time SCK is generated.

The parity OK signal is applied to the lower input of a NAND gate 317 in the command decoder circuit 219 to allow the circuit 219 to operate. A previously generated address OK signal from the address check 211 is applied to the upper input of the NAND gate 317 during the period $T_{18}$–$T_{32}$, and operates in conjunction with the parity OK signal from the parity check 215 to allow the NAND gate 317 to clock a J–K flip-flop 319, similar in structure and operation to the J–K flip-flop 245 in FIG. 7. Upon being clocked, the Q output of the flip-flop 319 changes to a "1" state enable signal. This enable signal is applied to a command decoder or demultiplexer 321 to decode the five input bits being applied from the command register circuit 213 in FIG. 10. The command decoder 321 may be similar to the decoders/demultiplexers discussed from page 9–160 to page 9–166 of *The Integrated Circuits Catalog for Design Engineers*, First Edition, of Texas Instruments, Inc.

The command decoder 321 converts the five input lines from the command register into 32 output control lines, with each output control line containing either a binary "1" or a binary "0" state signal. One of these output control lines may carry the RF switch command (a binary "1") which, as indicated in regard to FIG. 6, is applied to the RF switch register circuit 218. Another output control line may carry the amplifier gain command (a binary "1") which, as indicated in regard to FIG. 6, is applied to the amplifier gain register circuit 217. Additional output control lines (not shown) may be used as desired for other purposes, such as for amplifier tilt control of one or more downstream (or even upstream) amplifiers.

Figure 12:
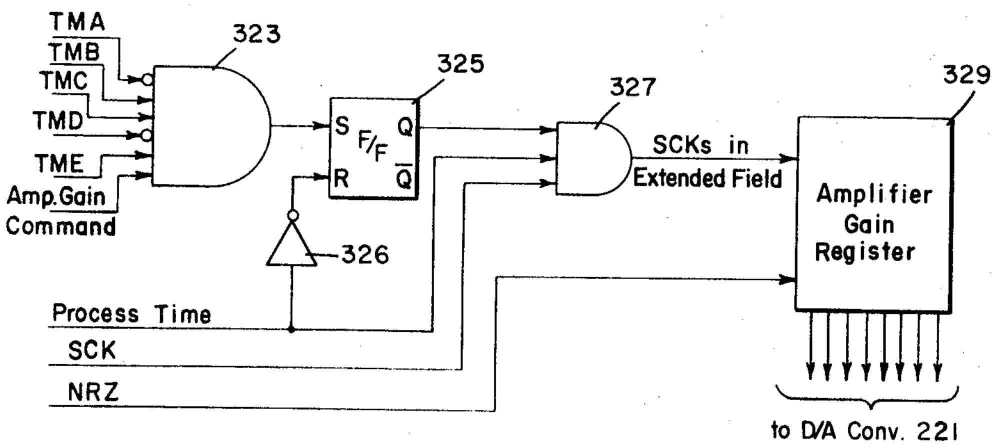
FIG. 12 is a schematic block diagram of the amplifier gain register circuit of FIG. 6.

Referring now to FIG. 12, the amplifier gain register circuit 217 of FIG. 6 is more fully illustrated. The amplifier gain command from the command decoder 321 in FIG. 11 is applied, along with the TMA, TMB, TMC, TMD and TME timing signals to an AND gate 323, with only the TMA and TMD waveforms being inverted at the inputs of the AND gate 323. The output of the AND gate 323 is applied to the set side of a flip-flop 325 while the process time waveform 239 is inverted by an inverter 326 and applied to the reset (R) side of the flip-flop 325. By this means the flip-flop 325 is placed in a reset condition at the termination of the previous process time signal, at the end of the previous message at a corresponding time $T_{32}$. The flip-flop 325 remains in this reset condition until the end of the parity bit time $T_{24}$, at which time the TMA, TMB, TMC, TMD and TME waveforms are respectively in "0," "1," "1," "0" and "1" binary states. At this time the AND gate 323 allows the amplifier gain command to pass through to set the flip-flop 325 such that its Q output goes to a "1" state. This "1" state output from the Q side of the flip-flop 325 is applied to one input of an AND gate 327. The process time waveform and SCK pulses are also applied as inputs to the AND gate 327. With this mechanization the AND gate 327 will only pass the eight command function SCK pulses occurring during the command function time, illustrated by the waveform 269 in FIG. 8. As indicated, these occur between the time when the flip-flop 325 is set ($T_{24}$) and when the flip-flop 325 is reset at the end of the process time ($T_{32}$) by the inversion of the negative-going trailing edge of the waveform 239. These eight command function SCK pulses are applied to an amplifier gain register 329 to allow the register 329 to serially clock in the eight bits of NRZ data, or command function bits, which occur between time $T_{24}$ and time $T_{32}$. The amplifier gain register 329 may be similar to the command register 303 in FIG. 10. The eight bits of NRZ data that are stored in the register 329 between times $T_{24}$ and $T_{32}$ are read out in parallel and applied to the D/A converter 221 (FIG. 6). As stated previously, the analog output of the D/A converter 221 is used to control the gain of the upstream amplifier 137 in FIG. 6.

The RF switch register circuit 218 of FIG. 6 is illustrated in detail in FIG. 13. The circuits 333, 335, 336, 337 and 339 of FIG. 13 are similar in structure and operation to the circuits 323, 325, 326, 327 and 329 illustrated in FIG. 12. The circuits of FIG. 13 have the same inputs as those of FIG. 12, with the exception that the AND gate 333 is enabled by an RF switch command rather than by the amplifier gain command of FIG. 12. Five of the eight bits out of the RF switch register 339 are used as attenuator control signals to respectively control the switches 123 through 127 in the switchable attentuators 128 of FIGS. 3 or 6. The remaining three of the eight bits out of the RF switch register 339 are used as filter control signals to respectively control the switches 111, 113 and 115 in the switching circuit 103 of FIGS. 3 or 6. By comparing FIGS. 12 and 13, it is obvious that if an amplifier gain command is generated by the command decoder circuit 219 of FIG. 6, the following eight bits of NRZ data occurring in the period $T_{24}$ $-T_{32}$ will be utilized to change the outputs of the amplifier gain register 329 (FIG. 12). Since an RF switch command was not generated, the circuitry of FIG. 13 would not be enabled. Therefore, the outputs of the RF switch register 339 of FIG. 13 will not be changed. In a like manner, if an RF switch command is generated by the command decoder circuit 219 of FIG. 6, the eight bits of NRZ data in the extended field would be utilized to change the outputs of the RF switch register 339 of FIG. 13, but not the amplifier gain register 329 of FIG. 12. controls digital In the system illustrated in FIG. 1, a noisy subscriber terminal or one that will not stop transmitting upstream and cannot be shut off by the LPC 16, such as, for example, the subscriber terminal 85, may saturate the upstream paths with noise such that any meaningful upstream SRS transmission from other subscriber terminals may be impossible. In this case the LPC 16 could locate the defective subscriber terminal by going into its search mode of operation and then command the phantom subscriber 87 to open at least the switch in the switching circuit 73 that control the passage of the upstream didital transmission therethrough (i.e., switch 115 in FIG. 3). Of course, this operation would prevent all subscriber terminals located downstream of the amplifier unit 79, including the subscriber terminal 85, from responding to downstream interrogations. However, it is obviously better to be able to receive some, rather than none, of the subscriber terminal responses during the time that the defective subscriber terminal 85 is being located and repaired or replaced.

The invention thus provides a system for substantially reducing the effects of noise and interference in the upstream path of a two-way CATV system. The local processing center 16 constantly monitors upstream transmissions and detects excessive noise and interference. When excessive noise or interference is detected the local processing center 16 goes into a search mode of operation to isolate the noise or interference. Once these are isolated the local processing center 16 sends digital commands to phantom subscriber units in the system to cause them to either selectively switch out unused portions of the CATV system that contain detected noise sources or command one phantom subscriber to vary the gain of an upstream amplifier and the following phantom subscriber to attenuate the signal to thereby increase the signal-to-interference ratio.

While the salient features have been illustrated and described it should be understood that the above-described system could be modified and still fall within the scope of this invention. For example, the system of FIG. 1 could be modified such that each phantom subscriber in the system would include noise measuring equipment to monitor the upstream, and even downstream, noise at its location. On one command from the LPC 16, a phantom subscriber could cause a noise measurement to be made. Each phantom subscriber could also include a transmitter for transmitting the digitized noise measurement to the LPC 16 upon another command from the LPC 16. Control lines, similar to those carrying the amplifier gain command and the RF switch command, could be used to cause these additional components to initiate the noise measurement and upstream noise measurement transmission functions. Furthermore, each phantom subscriber could perform other command functions other than those described. For example, a phantom subscriber could be used to control the gain as a function of frequency across the bandwidth of either or both of the upstream and downstream amplifiers in its locality.

It should, therefore, be readily apparent to those skilled in the art that other modifications can be made within the spirit and scope of the invention as set forth in the appended claims.

What is claimed is:

1. In a cable television network including a central station, a plurality of remotely located subscriber stations and a cable distribution network for allowing the central station to transmit downstream TV and digital signals to the subscriber stations and to receive frequency bands of upstream digital and TV signals from the subscriber stations, a system comprising:

a plurality of first means coupled to different positions in the cable distribution network, each of said first means only being responsive to command signals specifically addressed thereto from the central station for generating control signals; and plurality of second means respectively coupled in line at a plurality of different positions in the cable distribution network, each of said second means further coupled to an associated first means and being responsive to first control signals therefrom in a first mode of operation for blocking all upstream signals applied thereto, each of said second means being responsive to the first control signals in a second mode of operation for allowing at least one band of upstream signals to pass therethrough.

2. The system of claim 1 wherein each of said plurality of second means comprises:

a plurality of upstream filters respectively having a plurality of different bandpass frequencies for respectively passing the different bands of upstream digital and TV signals therethrough; and a plurality of first upstream switches respectively coupled in series with said plurality of upstream filters, each of said first upstream switches being controlled by an associated first control signal to open when the associated first control signal is in a first state and to close when the associated first control signal is in a second state.

3. The system of claim 1 further including:

a plurality of third means, each of said third means being coupled to an associated one of said first means and in series with an associated one of said second means for controlling the amplitude of any upstream signals therethrough in response to second and third control signals from the associated one of said first means.

4. The system of claim 3 wherein each of said third means includes:

fourth means coupled to the associated one of said second means for attenuating any upstream signals therethrough as a function of the second control signals, and fifth means serially coupled between said fourth means and a preselected part of the cable distribution network for amplifying any upstream signals passing through said fourth means as a function of one of the third control signals.

5. The system of claim 4 wherein said central station includes:

sixth means being responsive to excessive upstream noise from any external source injected into the cable distribution network between two adjacent first means for causing the central station to send command signals to said two adjacent first means, one of said two adjacent first means being responsive to the command signals applied thereto for causing its associated fifth means to increase the amplification of any upstream signals passing therethrough by a first predetermined amount, the other one of said two adjacent first means being responsive to the command signals applied thereto for causing its associated fourth means to increase the attenuation of any upstream signals passing therethrough by a second predetermined amount.

6. The system of claim 4 wherein said fifth means includes an amplifier whose gain is controlled as a function of the amplitude of the third control signal.

7. The system of claim 4 wherein said fourth means includes:

a plurality of attenuators each having a different attenuation, a plurality of second upstream switches respectively coupled in series with said plurality of attenuators, and a third upstream switch, any upstream signals applied to said fourth means being applied to each of said second and third upstream switches, each of said second and third upstream switches being controlled by an associated second control signal to open when the associated second control signals in a first state and to close when the associated second control signal is in a second state, said fourth means operating to allow any upstream signals to pass through only one of said second and third upstream switches at any given time.

8. The system of claim 7 wherein said fifth means includes an upstream amplifier whose gain is controlled as a function of the amplitude of the third control signal.

9. The system of claim 8 wherein each of said plurality of second means comprises:

a plurality of upstream filters respectively having a plurality of different bandpass frequencies for respectively passing the different bands of upstream digital and TV signals therethrough; and a plurality of first upstream switches respectively coupled in series with said plurality of upstream filters, each of said first upstream switches being controlled by an associated first control signal to open when the associated first control signal is in a first state and to close when the associated first control signal is in a second state.

10. The system of claim 9 wherein said central station includes:

sixth means being responsive to excessive noise from any external source injected into the cable distribution network between two adjacent first means for causing the central station to send command signals to said two adjacent first means, one of said two adjacent first means being responsive to the command signals applied thereto for causing its associated upstream amplifier to increase the amplification of any upstream signals passing therethrough as a function of the amplitude of the associated third control signal, the other one of said two adjacent first means being responsive to the command signals applied thereto for causing its associated fourth means to increase the attenuation of any upstream signals passing therethrough as a function of the first and second states of each of the associated second control signals.

11. The system of claim 9 wherein said central station includes:

sixth means for controlling the operation of said plurality of first means; and seventh means, coupled to said sixth means, being responsive to excessive upstream noise above a predetermined level in the cable distribution network for enabling said sixth means to selectively command said plurality of first means to block all upstream paths except those necessary to complete upstream signal paths to the central station in order to minimize the reception of upstream noise at the central station.

12. In a cable television network including a television control site and a plurality of remotely located television sites coupled to the television control site by way of a network of cables for allowing the television control site to transmit frequency bands of downstream TV and digital signals to the television sites and to receive frequency bands of upstream digital and TV signals from the television sites, a system for minimizing the reception of upstream noise at the television control site, said system comprising:

a plurality of control units each coupled in line with a cable at a different preselected location of the network of cables for controlling within a range of from complete attenuation to some predetermined level of amplification the amplitude of any upstream signals applied thereto;

first means located at the television control site for controlling said plurality of control units in a plurality of modes of operation; and second means, coupled to said first means, being responsive to excessive upstream noise above a predetermined level in the network of cables for causing said first means to initiate a search mode of operation wherein said first means selectively controls each of said plurality of control units to completely attenuate any upstream signals applied thereto in order to try to isolate the excessive upstream noise, said first means going into a first mode of operation whenever the excessive noise is isolated to some location between two adjacent control units in order to cause one of the two said adjacent control units to increase the amplitude of any upstream signals therethrough by a first amount and to cause the other one of the two said adjacent control units to decrease the amplitude of any upstream signals therethrough by a second amount.

13. The system of claim 12 wherein each of said control units includes:

third means coupled to the network of cables for respectively generating first and second control signals during the search and first modes of operation in response to command signals from said first means;

fourth means coupled in line with a preselected cable for increasing the amplitude of any upstream signals therethrough as a function of the first control signals; and fifth means coupled to said fourth means for decreasing the amplitude of any upstream signals therethrough as a function of the second control signals.

14. The system of claim 13 wherein said first means goes into a second mode of operation whenever the excessive noise cannot be isolated to some location between two adjacent control units and each of said control units further includes:

sixth means in said third means for generating third control signals during the second mode of operation in response to command signals from said first means;

seventh means, coupled in series with said fourth and fifth means, being responsive to the third control signals in a first operational condition for substantially blocking any upstream signals applied thereto, and being responsive to the third control signals in a second operational condition for allowing at least one band of the upstream signals to pass through said control unit, said plurality of control units being selectively controlled by said first means to only open upstream paths in the network of cable that are necessary to allow upstream signals to pass to the television control site in order to minimize upstream noise.

15. The system of claim 14 wherein each of said seventh means includes:

a plurality of upstream filters respectively having a plurality of different bandpass frequencies for respectively passing the different bands of upstream TV and digital signals therethrough; and a plurality of first upstream switches respectively coupled in series with said plurality of upstream filters, each of said upstream switches being controlled by an associated third control signal to open when the associated third control signal is in a first state and to close when the associated third control signal is in a second state.

16. In a cable television network including a central station, a plurality of remotely located substations and a distribution network for transmitting a plurality of downstream and upstream signals between said central station and said substations, a system comprising:

a plurality of first means coupled to different portions of said distribution network between said central station and said remote substations, each of said first means being capable of generating control signals in response to command signals from said central station; and a plurality of second means serially disposed in said distribution network, each of said second means further coupled to an associated first means and being responsive to control signals therefrom in a first mode of operation for attenuating all upstream signals, each of said second means being further responsive to control signals in a second mode of operation for transmitting at least some of said upstream signals.

17. A cable television system comprising:

a cable distribution network;

a control site coupled to said cable distribution network for transmitting downstream TV and digital signals thereinto;

a plurality of remote sites coupled to said cable distribution network for receiving the downstream TV and digital signal and for selectively transmitting frequency bands of upstream TV and digital signals to said control site;

a plurality of first circuits selectively coupled to said cable distribution network, each of said first circuits responding to command signals specifically addressed thereto by said control site for generating control signals in a plurality of modes of operation, each control signal having first and second operating states; and a plurality of switching circuits selectively coupled in line with cables in the cable distribution network, each of said switching circuits being responsive to first control signals in a first mode of operation for not allowing any upstream signals to pass therethrough, each of said switching circuits being responsive to first control signals in a second mode of operation for allowing at least one band of upstream signals to pass therethrough, said control site thereby selectively controlling said plurality of switching circuits to close all upstream transmission paths in each frequency band except those paths needed to complete the transmission of upstream signals to said control site.

* * * * *